Oct. 11, 1932.   N. R. LOURIE   1,882,511

ARTIFICIAL TOOTH AND SUPPORTING MEANS THEREFOR

Filed Nov. 15, 1929

Inventor:
Nicholas R. Lourie.
by Charles S. Gooding,
Att'y.

Patented Oct. 11, 1932

1,882,511

UNITED STATES PATENT OFFICE

NICHOLAS R. LOURIE, OF GLOUCESTER, MASSACHUSETTS

ARTIFICIAL TOOTH AND SUPPORTING MEANS THEREFOR

Application filed November 15, 1929. Serial No. 407,405.

This invention relates to an improvement in artificial teeth and supporting means therefor.

The object of the invention is to provide an artificial tooth, together with a support therefor, which may be utilized to hold the tooth firmly and strongly in position upon a dental plate, said tooth and support, furthermore, being so constructed that in case of the tooth breaking, another tooth of novel construction can be readily attached to said support and firmly secured in position thereon.

The artificial tooth and supporting means of this invention is an improvement over a similar invention for which I have obtained Letters Patent No. 1,400,613, dated December 20, 1921.

The invention consists in the combination and arrangement of parts set forth in the following specification and particularly as pointed out in the claim thereof.

Referring to the drawing.

Like numerals refer to like parts throughout the several views of the drawing.

Figure 1:
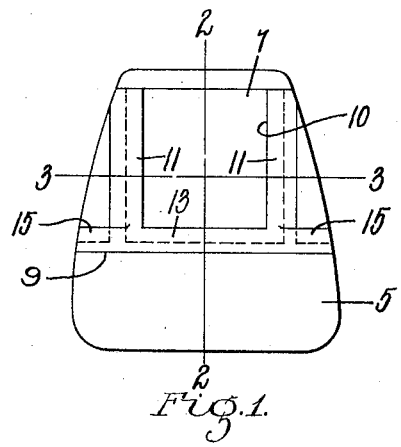
Figure 1 represents a rear elevation of a tooth and supporting means therefor embodying my invention.
Figure 2:
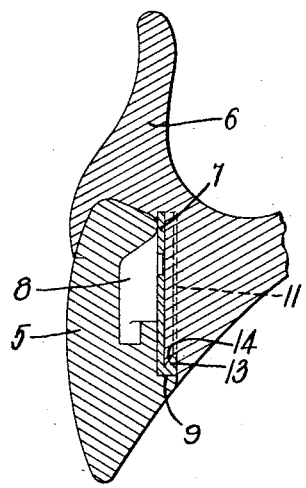
Fig. 2 is a sectional elevation taken on the line 2—2 of Fig. 1, illustrating the tooth and its supporting means attached to a dental plate, a portion only of the latter being shown.
Figure 3:
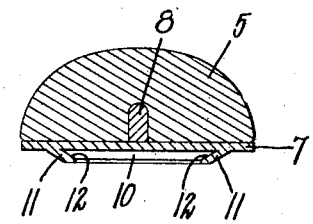
Fig. 3 is a horizontal section taken on the line 3—3 of Fig. 1.

In the drawing, referring to Figs. 1, 2 and 3, 5 is a front tooth, 6 is a dental plate of well known form and of the type employed in the construction of an upper set of teeth, and 7 is a support by means of which the tooth 5 is attached to the plate 6.

The support 7 embodies therein a flat plate and a pin 8 which is molded and baked in the tooth 5 when the latter is formed, and said pin is secured to the flat plate portion of the support 7 either by brazing, soldering or riveting. When the tooth 5 is in position upon the support 7, a shoulder 9 provided upon the tooth abuts against an edge of the support 7.

Located upon the opposite side of the support 7 from that upon which the pin 8 is located is a groove 10 which is formed between a pair of oppositely disposed parallel flanges 11, the latter being inclined toward each other, thereby forming undercut portions 12 at the sides of the groove 10. The groove 10 extends from the top edge of the support 7 inwardly and terminates at a flange 13 which extends between the flanges 11 and is also inclined to form an undercut portion 14 at the inner end of said groove. The flange 13 is extended at 15 at its opposite ends from where it intersects the flanges 11, to the sides of the support 7, see Fig. 1.

In constructing a set of teeth, the support 7 with the tooth 5 secured thereto is pressed against the temporarily plastic material of which the dental plate 6 is constructed until said plastic material has been forced into the groove 10 and into the undercut portions 12 and 14 thereof, and after the dental plate has been vulcanized in a manner well known to those skilled in the art to harden the dental plate, the tooth 5 will be securely fastened to said plate.

Figure 4:
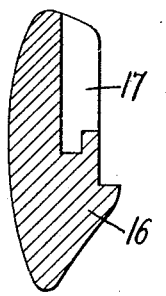
Fig. 4 is a vertical section of a tooth used for replacement.

If, in use, the tooth 5 should become broken, it is removed from the support 7 leaving the pin 8 projecting from the latter. To replace this broken tooth, I provide a tooth 16 such as is illustrated in section in Fig. 4, said tooth being provided with a groove 17 formed at the rear thereof to receive the pin 8. The replacement tooth 16 is attached to the support 7 by slipping the tooth longitudinally thereof upon the pin 8 until the latter abuts against the inner extremity of the groove 17, after which dental cement is employed to securely hold the tooth upon the pin, and cement, furthermore, is employed to fill that portion of the opening 17 which is not filled by the pin 8.

It will be evident from the foregoing description and illustrations of my invention that a broken tooth may be very easily and quickly removed from the dental plate 6 leaving the support 7 therein, and a replacement tooth may be very easily and quickly affixed to the support 7 without it being necessary to repair the dental plate or revulcanize the same.

It will furthermore be evident that the support 7 is at all times very firmly secured to the dental plate 6 for the reason that the material comprising said plate is firmly imbedded in the groove 10 formed between the inclined flanges 11 and 13.

I claim:

In combination an artificial tooth, a plate positioned against the back of said tooth, a member fastened to said plate and imbedded in the tooth, a pair of oppositely disposed flanges projecting rearwardly from the plate and inclined toward each other, whereby a dove-tail shaped groove is formed across the plate and another inclined flange projecting rearwardly from the plate and intersecting both of the other flanges and closing an end of said groove, all of the flanges being adapted to be imbedded in the material of a dental plate.

In testimony whereof I have hereunto set my hand.

NICHOLAS R. LOURIE.